April 24, 1928.
L. B. METTLER
RADIATOR OVER-FLOW
Filed Jan. 12, 1925
1,667,128
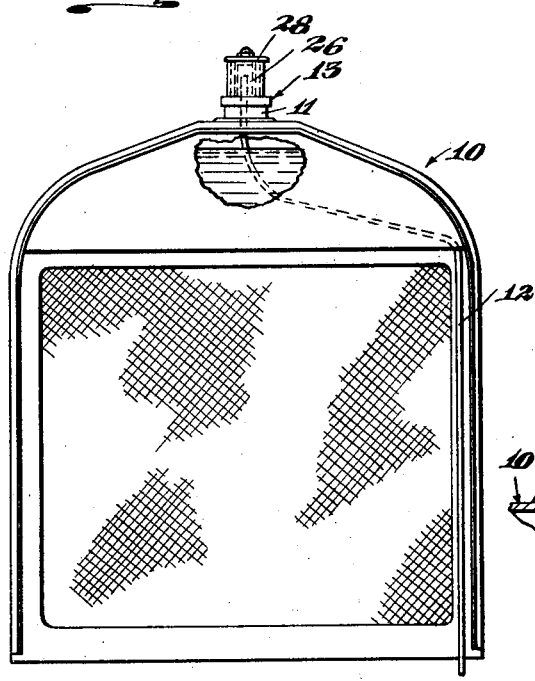
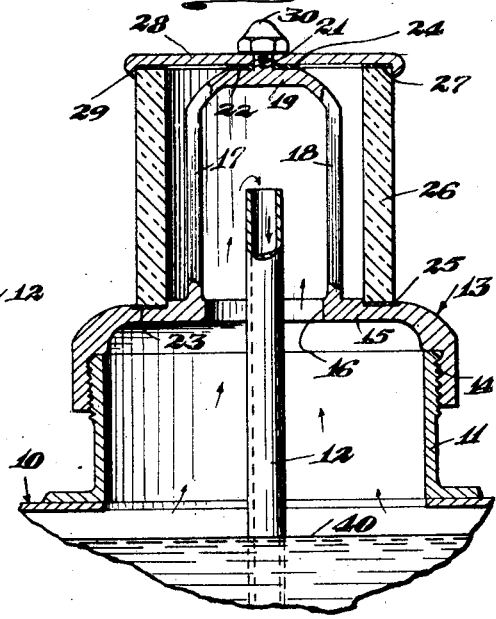
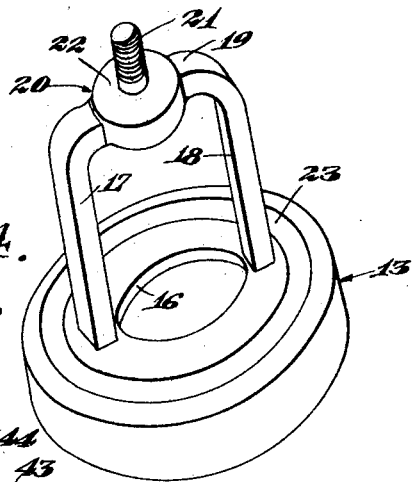
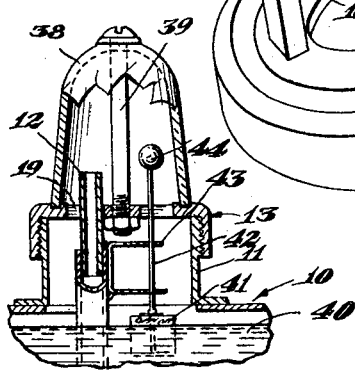
INVENTOR.
Lee B. Mettler,
BY
ATTORNEY Patented Apr. 24, 1928.

1,667,128

UNITED STATES PATENT OFFICE.

LEE B. METTLER, OF LOS ANGELES, CALIFORNIA.

RADIATOR OVERFLOW.

Application filed January 12, 1925. Serial No. 1,952.

My invention pertains to a visible overflow for radiators used in connection with engines or machines that tend to over heat, such as internal combustion engines, air compressors, electric dynamos, and motors that employ liquid as a cooling medium that is circulated therethrough, and more particularly on the radiators of motor vehicles since the overflow used on such radiators cannot be readily seen by the operator while operating the vehicle.

The engines of motor vehicles often over heat when in operation from such prevalent causes as a leak in the radiator associated therewith, atmospheric conditions, altitude, high-speed, idling, loss of the fan belt, running in low gear, retarded spark, heavy grades, over loading or other operating imperfections that cause the cooling fluid to expand so the same over-flows and is lost.

An object is to provide a visible over-flow means for radiators of motor vehicles whereby the overheating of the internal combustion engine thereof may be detected by the action of the cooling fluid employed therein becoming visible by the heat of such engine, and in which the over flow may be elevated to a greater height relative to the engine. than normally to overcome the frequent tendency of the engine to over heat.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a rear elevation of a radiator such as used on motor vehicles.

Figure 2 is a view in vertical cross section of the upper portion of the radiator shown in Figure 1;

Figure 3 is a perspective view of the radiator cap shown in Figure 1;

Fig. 4 shows a modified form of the invention.

More specifically, 10 indicates a vehicle radiator having a threaded filler nipple 11, and an overflow pipe 12.

A radiator cap 13 is provided with internal threads 14 to fit the threads of the nipple 11. The head 15 of the cap is formed with a central opening 16, and adjacent the annular edge thereof are integral upwardly extending legs 17 and 18, that are connected by a cross bar or bridge 19. The middle portion 20 of the bridge is preferably disc-shaped and centrally located above the opening 16 from which projects a threaded pintle 21. A gasket seat 22 is machined on the annular surface around the pintle 21, and a seat 23 of larger diameter is machined on the upper surface of the cap 13 encircling the legs 17 and 18. Gaskets 24 and 25 are fitted to the respective seats 22 and 23.

In order to provide a visible stand pipe on the cap 13 a glass cylinder 26 of suitable thickness and a diameter corresponding to that of the seat 23 is positioned on the gasket 25, and a complementary gasket 27 is placed on the end of the cylinder. To provide a closure for the cylinder a head 28 provided with a suitable opening to fit the pintle 21 and an annular downwardly turned flange is formed on the head to overlap the outer edge of the cylinder 26 so as to retain the cylinder and gasket central of the pintle 21, and a blind nut 30 is screwed down to bear on the cap to tighten the gaskets and cylinder 26 to make a water tight joint therebetween.

The over-flow pipe extends upwardly through the central opening 16 substantially midway the length of the cylinder 26, (as shown in Figure 2) but the position of the end thereof in relation to the cylinder is variable in that it may extend into the cylinder a short distance or a longer distance, as may be the case with some engines for the reason that all engines do not heat in a like manner and also that all radiators have not the same relative capacity in relation to the engine to which they may be connected.

In Figure 4 the legs 17 and 18 of the cap 13 are eliminated and the bridge 19 formed in the head of the cap spans the opening 16 thereof. A glass closure 38 that is cone-shaped is substituted for the cylindrical closure 26 of Figure 2 and is fastened to the cap by a screw threaded bolt 39 to the bridge 19. With this construction the over-flow pipe 12 enters the closure 38 to one side of the bridge. For the purpose of indicating the level of a liquid 40 in the radiator 10, a float 41 is provided having a stem 42 projecting upwardly through a bracket 43 fixed to the over-flow pipe and continues into the closure 38 and a ball 44 or stop is fitted to the end thereof so that when the liquid level falls below the normal level so that the float stem will be retained in the bracket and may rise when the liquid raises.

The manner in which the device operates as an indicator is as follows: assuming an engine in a vehicle that has for some reason begun to over heat, the temperature of the cooling liquid 40 which normally should be about 180° F., would very shortly rise, thereby causing the liquid to further expand and therefore the level thereof would rise and gradually enter the transparent closure of the cap where it would be visible to an operator of a vehicle. Upon continued operation of the engine the liquid would continue to rise until it reached the projecting end of the overflow pipe into which it would flow therethrough out of the radiator and consequently be wasted from the cooling system of the vehicle and should the temperature of the water increase to the point that it would boil this would be visibly indicated to the operator.

I claim:—

A radiator overflow indicator comprising a cap having an opening therethrough for communication with the radiator and for the extension therethrough of the upper end of the overflow pipe of the radiator, a transparent element surmounting the cap and enclosing the end of the overflow pipe, and a securing device for said element arising from the cap from a point thereon within said closure element, said securing device comprising a pair of upright legs and a bridge connecting the tops of said legs, a screw threaded pintle projecting upwardly from the central portion of said bridge, a head having an aperture through which said pintle projects, and a nut adapted to screw onto said pintle to clamp said head down upon the transparent element for the purpose of holding the latter in place.

LEE B. METTLER.